April 9, 1940.　　　L. SCHWARZMAYR　　　2,196,400
MOTION PICTURE LIGHT BEAM PROTECTING SYSTEM
Filed Nov. 29, 1938　　　2 Sheets-Sheet 1

INVENTOR:
Ludwig Schwarzmayr

April 9, 1940.  L. SCHWARZMAYR  2,196,400
MOTION PICTURE LIGHT BEAM PROTECTING SYSTEM
Filed Nov. 29, 1938  2 Sheets-Sheet 2

INVENTOR:
Ludwig Schwarzmayr

Patented Apr. 9, 1940

2,196,400

UNITED STATES PATENT OFFICE 2,196,400

MOTION PICTURE LIGHT BEAM PROTECTING SYSTEM

Ludwig Schwarzmayr, San Francisco, Calif.

Application November 29, 1938, Serial No. 242,955

5 Claims. (Cl. 88—24)

My invention relates to motion picture light beam protecting systems.

In motion picture show rooms smoke entering the picture producing light beam projected to the screen very destructively affects the production of pictures, especially when the smoke enters the light beam near the motion picture machine, where the rays are still close together, and so every particle of smoke deflects a great number of rays from their original course.

An object of my invention is to provide a light beam protecting system which absolutely prevents entrance of smoke to the greatest part of the light beam projected from a motion picture machine through a motion picture show room containing air filled with smoke.

Another object is to provide a protection against entrance of smoke to the light beam with the use of a relatively small quantity of pure air, so that in cold weather the cost of heating air derived from the outside be relatively low.

I attain these objects by the construction and arrangement illustrated in the accompanying drawings in which—

Figure 1:
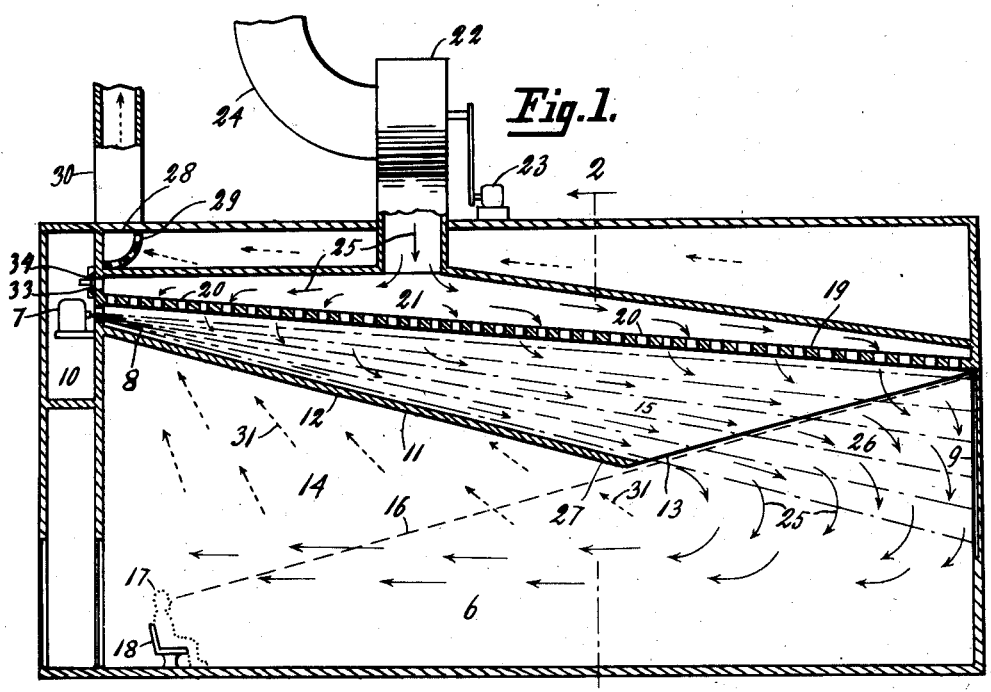
Figure 1 is a vertical longitudinal section of a motion picture theater with the light beam protecting system illustrated in accordance with my invention.
Figure 2:
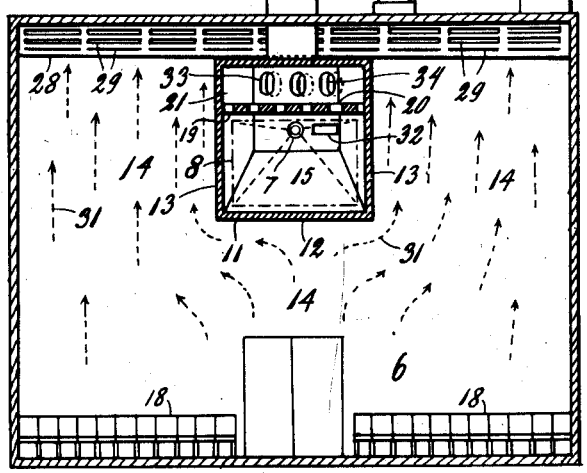
Fig. 2 is a cross section of the motion picture show room and light beam protecting system on line 2—2 in Fig. 1.

Referring to the drawings, Figs. 1 and 2, the motion picture show room 6, the motion picture machine 7 projecting a light beam 8 to the screen 9, and the operator room 10, are of the common construction and arrangement.

An enclosure 11 is positioned to surround the first part of the light beam 8, so that its sides form partitions 12 and 13—13 between the impure air zones 14—14 of the room and the light beam zone 15. I prefer to extend the partitions 12 and 13 to near the line of vision 16 of motion picture observers 17 sitting on the rear seats 18 of the room. The upper side 19 of the enclosure extends over the entire length and width of the light beam, and has air passages 20—20 distributed over its entire area. The air passages 20 communicate with the air distribution chamber 21, which receives pure air under pressure from the fan 22 driven by the motor 23. The fan 22 derives pure air from the outside through the tube 24. In cold weather the air is heated by any of the heating devices in common use. (Not shown in the drawing.) In Fig. 1 the full line arrows 25—25 illustrate the pure air under pressure from the fan 22 forced into the enclosure 11, and directed by the latter toward the unshielded light beam zone 26. At the forward end 27 the enclosure 11 is of a configuration corresponding with that of the light beam, and preferably is only slightly larger than the light beam (see Fig. 2), so that it directs the stream of pure air into the unshielded light beam zone.

At the rear end of the room is a tube 28 having air outlets 29—29, and is connected with the flue 30 through which the impure air is discharged to the exterior. As is shown by the dotted line arrows 31—31, which illustrate the flow of impure air, the outlets 29 cause the impure air to flow away from the unshielded light beam zone 26.

It is desirable to prevent strong flow of air from the enclosure 11 through the observation opening 32 to the operator room 10. To prevent excessive flow I provide one or more air passages 33 (three are shown in the drawings) connecting the operator room 10 with the air distributing chamber 21. A slidably mounted gate 34 provides for variation of the flow through the passages 33, whereby the air pressure in the operator room may be adjusted to any desired relationship with the air pressure in the enclosure 11.

Figures 3, 4, 5:
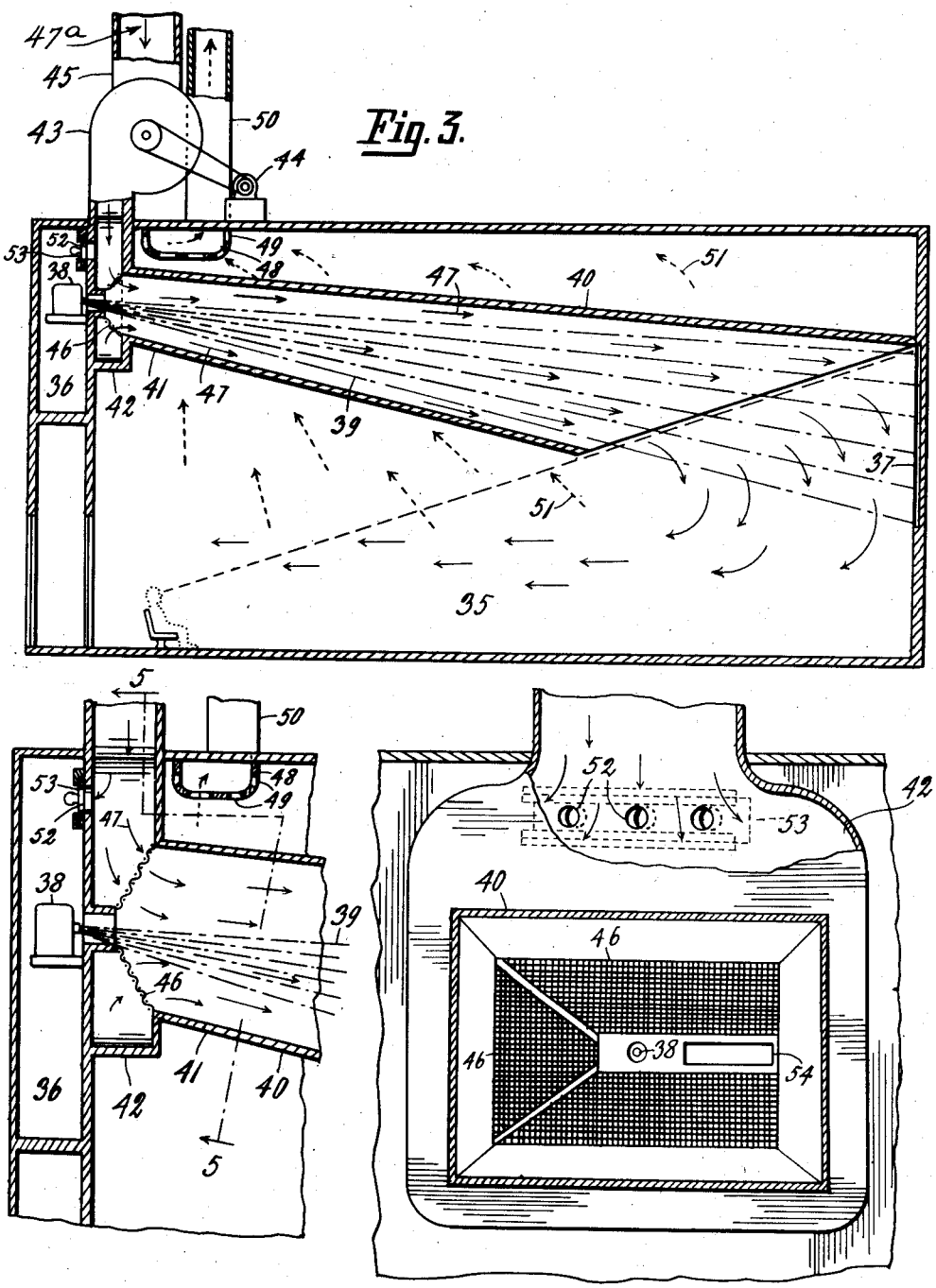
Fig. 3 is a vertical longitudinal section of a motion picture theater with a modified light beam protecting system.
Fig. 4 is a detailed view of part of the light beam protecting system shown in Fig. 3.
Fig. 5 is a sectional view on line 5—5 in Fig. 4, the light beam is not shown in this drawing.

Figs. 3, 4 and 5 show a modified form of the invention. The motion picture show room 35, the operator room 36, the screen 37, and the motion picture machine 38 projecting the light beam 39, are of the usual arrangement. The enclosure 40 is disposed to surround the light beam 39, and to its rear end 41 is connected the air distribution chamber 42, which receives pure air under pressure from the fan 43 driven by the motor 44. The fan 43 derives pure air through the tube 45 from the exterior. A screen 46, secured between the enclosure 40 and the distribution chamber 42, delivers the air in the enclosure in an even and forwardly directed stream. The pure air stream under pressure of the fan is illustrated in full line arrows 47—47. The arrow 47a illustrates supply of pure air.

A conduit 48 at the rear part of the room 35 has outlets 49 for impure air, and is connected with the flue 50 which discharges the impure air to the exterior. The dotted line arrows 51—51 indicate the impure air and its movement.

As is best shown in Figs. 4 and 5, air passages 52 connect the operator room 36 with the air distribution chamber 42. By the slidably mounted gate 53 the flow of air from the chamber 42 to the operator room can be adjusted to establish an air pressure in the latter preventing excessive flow through the observation opening 54.

By the disclosed invention a relatively small quantity of pure air is capable to prevent entrance of impure air to the picture producing light beam and, consequently, the cost of heating the air in cold weather is relatively low.

I claim:

1. In a motion picture light beam protecting system, a motion picture show room having a screen, a motion picture machine projecting a picture productive light beam through said room to the screen, a light beam enclosure in said room and comprising partitions disposed between the zone of the room traversed by said light beam and the zone of the room removed from the light beam, and air impelling mechanism communicating with said light beam enclosure and with a source of pure air to deliver pure air under pressure into the light beam enclosure.

2. In a motion picture light beam protecting system, a motion picture show room having a screen, a motion picture machine projecting a light beam through said room to the screen, a light beam enclosure extending from the rear end of said room to near the picture observation zone of the room to direct a stream of air forwardly to the unshielded light beam zone, air impelling mechanism communicating with the said light beam enclosure and with a source of pure air, and impure air outlets located at the rear part of the said room.

3. In a motion picture light beam protecting system, a motion picture show room having a screen, a motion picture machine projecting a picture productive light beam through the room to the screen, an enclosure surrounding the first part of said light beam, a source of pure air under pressure, the upper side of said enclosure extending over the entire upper side of said light beam and having air passages distributed over its entire area and connecting the enclosure with the source of pure air under pressure.

4. In a motion picture light beam protecting system, a motion picture show room and an operator room separated by a partition having an observation opening, a motion picture machine projecting a light beam through said show room, a light beam enclosure in said show room having its sides disposed outside of the said observation opening, and air impelling mechanism in communication with the said light beam enclosure and the said operator room and with a source of pure air to deliver pure air under pressure into the said light beam enclosure and into the operator room.

5. In a motion picture light beam protecting system, a motion picture show room and an operator room separated by a partition having an observation opening, a motion picture machine projecting a light beam through said show room, a light beam enclosure in said show room having its side disposed outside of the said observation opening, air impelling mechanism in communication with the said light beam enclosure and said operator room and with a source of pure air to deliver pure air under pressure into the said light beam enclosure and into the operator room, and means to vary the flow to the operator room.

LUDWIG SCHWARZMAYR.